United States Patent
De Wolf et al.

(10) Patent No.: US 10,995,257 B2
(45) Date of Patent: *May 4, 2021

(54) PROCESS TO PRODUCE OIL OR GAS FROM A SUBTERRANEAN FORMATION USING A CHELATING AGENT

(71) Applicant: Akzo Nobel Chemicals International B.V., Amersfoort (NL)

(72) Inventors: Cornelia Adriana De Wolf, Eerbeek (NL); Hisham Nasr-El-Din, College Station, TX (US); Estevao De Oliveira Barra, Deventer (NL); Edwin Rudolf Antony Bang, Arnhem (NL); Theodor Johannes Stanitzek, Zülpich (DE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 879 days.

This patent is subject to a terminal disclaimer.

(21) Appl. No.: 14/406,706

(22) PCT Filed: Jun. 14, 2013

(86) PCT No.: PCT/EP2013/062317
§ 371 (c)(1),
(2) Date: Dec. 9, 2014

(87) PCT Pub. No.: WO2013/189842
PCT Pub. Date: Dec. 27, 2013

(65) Prior Publication Data
US 2015/0107832 A1  Apr. 23, 2015

Related U.S. Application Data

(60) Provisional application No. 61/661,055, filed on Jun. 18, 2012.

(30) Foreign Application Priority Data

Jul. 5, 2012 (EP) .................................. 12175064

(51) Int. Cl.
C09K 8/52 (2006.01)
E21B 43/16 (2006.01)
(Continued)

(52) U.S. Cl.
CPC ............ *C09K 8/52* (2013.01); *B01D 17/0208* (2013.01); *B01D 17/042* (2013.01);
(Continued)

(58) Field of Classification Search
CPC  B01D 17/00–048; C10G 1/047; C10G 33/02; C10G 33/04; C10G 75/02; E21B 43/34; E21B 43/16–285
See application file for complete search history.

(56) References Cited

U.S. PATENT DOCUMENTS 1,223,659 A  4/1917 Barnickel
1,531,173 A  3/1925 Brady
(Continued)

FOREIGN PATENT DOCUMENTS

WO  2007/020592 A2  2/2007

OTHER PUBLICATIONS

LePage et al., "An Environmentally Friendly Stimulation Fluid for High-Temperature Applications," Feb. 2010 SPE Journal.
(Continued)

Primary Examiner — George S Gray
(74) Attorney, Agent, or Firm — Lorenz & Kopf, LLP

(57) ABSTRACT

A two-step process to produce oil or gas from a subterranean formation wherein in a first step the subterranean formation is treated with an aqueous composition containing a chelating agent selected from the group of glutamic acid N,N-
(Continued)

Figure 1:
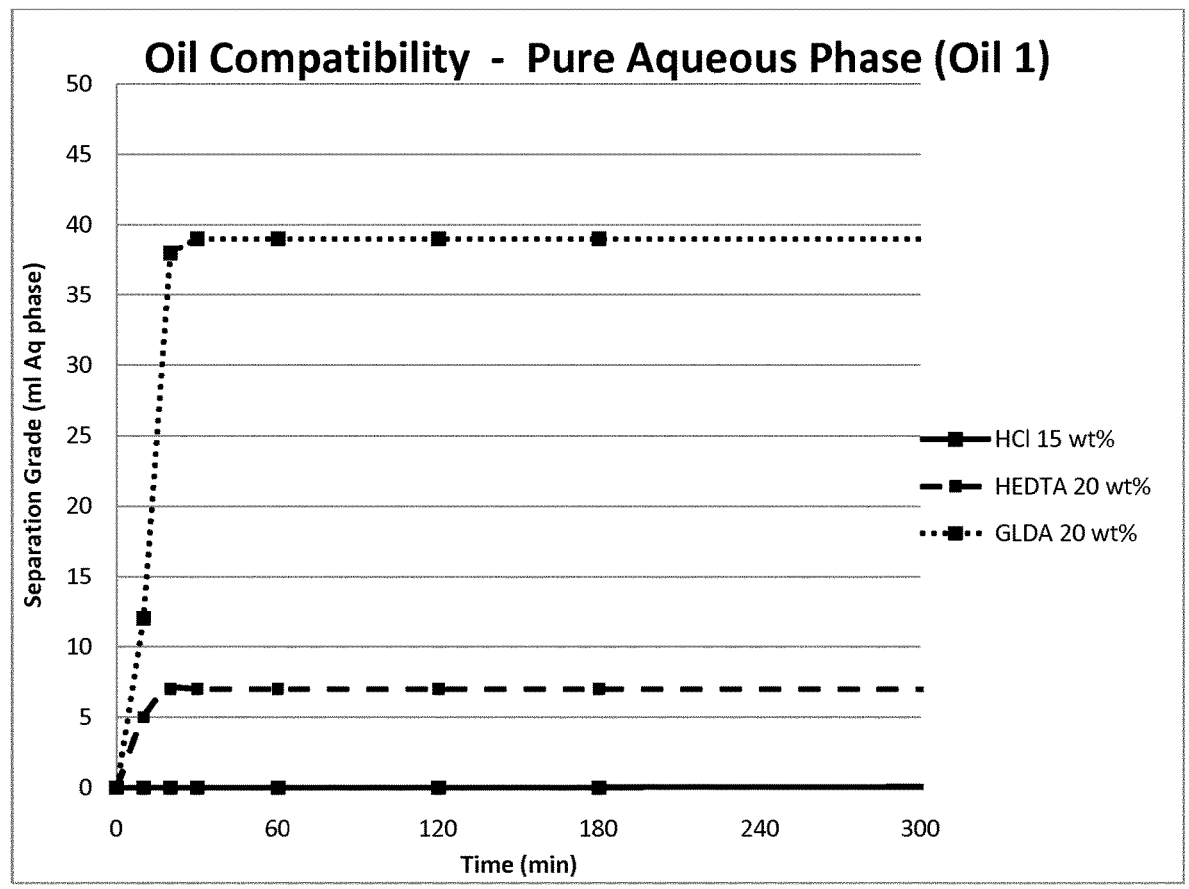

diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine N,N',N'-triacetic acid or a salt thereof (HEDTA) and wherein, in a next step, in the outlet streams from the subterranean formation the aqueous phase is separated from the non-aqueous phase.

15 Claims, 5 Drawing Sheets

(51) Int. Cl.
  *E21B 43/34* (2006.01)
  *B01D 17/04* (2006.01)
  *C10G 75/02* (2006.01)
  *C09K 8/70* (2006.01)
  *C09K 8/94* (2006.01)
  *B01D 17/02* (2006.01)
  *C09K 8/68* (2006.01)
  *C10G 33/02* (2006.01)
  *C09K 8/528* (2006.01)
  *C10G 1/04* (2006.01)
  *B01D 17/06* (2006.01)
  *C09K 8/72* (2006.01)
  *C10G 33/04* (2006.01)
  *C09K 8/86* (2006.01)

(52) U.S. Cl.
  CPC .......... *B01D 17/047* (2013.01); *B01D 17/06* (2013.01); *C09K 8/528* (2013.01); *C09K 8/68* (2013.01); *C09K 8/70* (2013.01); *C09K 8/72* (2013.01); *C09K 8/86* (2013.01); *C09K 8/94* (2013.01); *C10G 1/047* (2013.01); *C10G 33/02* (2013.01); *C10G 33/04* (2013.01); *C10G 75/02* (2013.01); *E21B 43/16* (2013.01); *E21B 43/34* (2013.01)

(56) References Cited

U.S. PATENT DOCUMENTS

| | | | |
|---|---|---|---|
| 2,167,327 A | | 7/1939 | Talley et al. |
| 2,319,885 A | | 5/1943 | Roberts et al. |
| 5,128,046 A | * | 7/1992 | Marble .............. B01D 17/0205 166/267 |
| 5,965,029 A | * | 10/1999 | Simon .................... B01D 15/00 210/104 |
| 8,653,009 B2 | | 2/2014 | Hellsten et al. |
| 2002/0023752 A1 | * | 2/2002 | Qu ............................ C09K 8/68 166/308.1 |
| 2008/0200354 A1 | | 8/2008 | Jones et al. |
| 2008/0277112 A1 | * | 11/2008 | Welton .................... C09K 8/528 166/270.1 |
| 2010/0276152 A1 | | 11/2010 | De Wolf et al. |
| 2012/0067576 A1 | | 3/2012 | Reyes et al. |
| 2012/0279711 A1 | * | 11/2012 | Collins .................. C09K 8/508 166/300 |
| 2013/0126176 A1 | * | 5/2013 | Al-Mutairi ............... C09K 8/74 166/308.2 |

OTHER PUBLICATIONS

Mahmoud et al., "Evaluation of a New Environmentally Friendly Chelating Agent for High-Temperature Applications," Feb. 2010 SPE Journal.
Mahmoud et al., "Optimum Injection Rate of a New Chelate That Can Be Used to Stimulate Carbonate Reservoirs," 2010 SPE Journal.
A. Tengirsek and N Mohamed, in "Towards Zero Flaring", *Middle East & Asia Reservoir Review*, No. 3, 2002, pp. 5-9.
Sunil L. Kokal, Saudi Aramco, Chapter 12. "Crude Oil Emulsions", Petroleum Engineering Handbook—vol. 1, pp. I-534-I-570.
Katrina Schultz, SPE et al., "Crude Oil Compatibility Method Significantly Minimizes Volumes Required", SPE International, pp. 1-9.
Syed A. Ali, Donald G. Hill, Oil & Gas Journal; "Process, optimized acidizing reduce production facility upsets".
A. Rostami, and, A. Nasr-El-Din, "Review and Evaluation of Corrosion inhibitors Used in Well Stimulation", Texas A&M University.
"Evaluation of Intra-Molecular Cross-Linke Polymers". By Wei Wang (University of Wyoming) / Xiangguo Lu (Daqing Petroleum Institute) / Xina Xie (U. of Wyoming).
Search report for EP 12175064 dated Nov. 23, 2012.
International Search report for PCT/EP2013/062317 dated Oct. 1, 2013.
Durham et al., "Causes and Solutions to Surface Facilities Upsets Following Acid Stimulation in the gulf of Mexico," SPE Production & Facilities, Feb. 1997, pp. 16-19.
Hebert et al., "Novel Filtration Process Eliminates System Upset Following Acid Stimulation Treatment," prepared for presentation at the 1996 SPE Annual Technical Conference and Exhibition, Oct. 6-9, 1996, pp. 279-285.

* cited by examiner

PROCESS TO PRODUCE OIL OR GAS FROM A SUBTERRANEAN FORMATION USING A CHELATING AGENT

This application is a national stage filing under 35 U.S.C. § 371 of PCT/EP2013/062317, filed Jun. 14, 2013, which claims priority to European Patent Application No. 12175064.0, filed Jul. 5, 2012, and claims benefit from U.S. Provisional Patent Application No. 61/661,055, filed on Jun. 18, 2012. Each of these applications is hereby incorporated herein by reference in their entirety.

The present invention relates to a two-step process to produce oil or gas from a subterranean formation wherein in a first step the subterranean formation is treated with an aqueous composition containing glutamic acid N,N-diacetic acid or a salt thereof (GLDA), aspartic acid N,N-diacetic acid or a salt thereof (ASDA), methylglycine N,N-diacetic acid or a salt thereof (MGDA) and/or N-hydroxyethyl ethylenediamine N,N',N'-triacetic acid or a salt thereof (HEDTA) and wherein, in a next step, in the outlet streams from the subterranean formation the aqueous phase is separated from the non-aqueous phase.

Subterranean formations from which oil and/or gas can be recovered can contain several materials contained in porous or fractured rock formations. The naturally occurring hydrocarbons, such as oil and/or gas, are trapped by overlying rock formations with lower permeability. The reservoirs are found using hydrocarbon exploration methods and often one of the purposes of withdrawing the oil and/or gas therefrom is to improve the permeability of the formations. The rock formations can be distinguished by their major components, and one category is formed by the so-called carbonate formations, which contain carbonates as the major constituent (like calcite, chalk, and dolomite). Another category is formed by the so-called sandstone formations, which contain siliceous materials as the major constituent. A third one is formed by shales, which contain very fine particles of many different clays covered with organic materials to which gas and/or oil are adsorbed. Shale amongst others contains many clay minerals like kaolinite, illite, chlorite, and montmorillonite, as well as quartz, feldspars, carbonates, pyrite, organic matter, and cherts.

In a few documents the use of GLDA in acidizing carbonate formations is disclosed.

Mahmoud M. A., Nasr-el-Din, H. A., De Wolf, C. A., LePage, J. N., Bemelaar, J. H. in "Evaluation of a New Environmentally Friendly Chelating Agent for High-Temperature Applications," presented at the SPE International Symposium on Formation Damage Control, Lafayette, La., Feb. 10-12, 2010, published as SPE 127923, disclose the use of GLDA to dissolve calcium from carbonate rocks and to form wormholes. In this document aqueous formulations containing GLDA and optionally NaCl are disclosed.

LePage, J. N., De Wolf, C. A., Bemelaar, J. H., Nasr-el-Din, H. A. in "An Environmentally Friendly Stimulation Fluid for High-Temperature Applications," presented at the SPE International Symposium on Oilfield Chemistry, The Woodlands, Tex., Apr. 20-22, 2009, published as SPE 121709, disclose that GLDA has a good capacity for dissolving calcite and that it is highly soluble in acidic solutions.

Mahmoud M. A., Nasr-el-Din, H. A., De Wolf, C. A., LePage, J. N. in "Optimum Injection Rate Of A New Chelate That Can Be Used To Stimulate Carbonate Reservoirs," presented at the SPE Annual Technical Conference and Exhibition, Florence, Italy, Sep. 20-22, 2010, published as SPE 133497, disclose the use of GLDA to create wormholes by carbonate acidizing.

Crude oil or gas is seldom produced alone, because they are generally commingled with water. Water present in the crude oil or gas, also called produced water, has its origin in treatment fluids pumped downhole via the production line or another injection well, and water that is normally present downhole. In addition, when producing oil and gas, fractions of the valuable crude oil and/or gas stream will always contain remainders of the acidizing or treatment fluids dissolved in such produced water.

Saleable crude oil and gas must comply with certain product specifications, including the amount of basic sediment, water, and salt, which means that the fraction of the oil and/or gas containing produced water must be separated from the other fractions containing mainly oil or gas to meet crude specifications.

Produced water may be present as "free" water (i.e., water that will settle out fairly rapidly), and it may be produced in the form of an emulsion. Crude oil or gas emulsions form when oil or gas and water (brine) come into contact with each other, when there is sufficient mixing, and in many cases when an emulsifying agent or emulsifier is present. During crude oil production, there are several sources of mixing, often referred to as the amount of shear, including flow through reservoir rock; bottomhole perforations/pump; flow through tubing, flow lines, and production headers; valves, fittings, and chokes; surface equipment; and gas bubbles released because of phase change. The amount of mixing depends on several factors and is difficult to avoid. In general, the greater the mixing, the smaller the droplets of water dispersed in the oil and the tighter the emulsion. The second important factor in emulsion formation is the presence of an emulsifier. The presence, amount, and nature of the emulsifier determine, to a large extent, the type and tightness of an emulsion. The natural emulsifiers in a crude oil or gas include higher-boiling fractions, such as asphaltenes and resins, organic acids, and bases. Other surface-active components that may be present and originate from the chemicals injected into the formation or wellbores can also be considered emulsifiers (e.g., drilling fluids, stimulation chemicals, corrosion inhibitors, scale inhibitors, wax, and asphaltene control agents). Crude oil or gas with a small amount of emulsifier forms a less stable emulsion and separates relatively easily, while other crude oils or gases containing other types and higher amounts of emulsifier lead to very stable or tight emulsions.

Emulsions can be difficult to treat and may cause several operational problems in wet-crude handling facilities and gas/oil separating plants. Emulsions can create high-pressure drops in flow lines, lead to an increase in demulsifier use, and sometimes cause trips or upsets in wet-crude handling facilities. The problem is usually at its worst during the winter because of lower surface temperatures. These emulsions do not meet crude specifications for transportation, storage, and export and to reduce corrosion and catalyst poisoning in downstream processing facilities.

For all the above reasons, it is currently standard practice to dump or flare the parts of produced oil and/or gas that contain water and/or the spent acid derived from the acidizing operation. In the state of the art the flaring or dumping of the fraction containing produced water is not often acknowledged to pose a problem.

Hence, the presence of water in part of the produced oil and/or gas creates several problems, of which one is that it usually increases the unit cost of oil or gas production, or at least significantly decreases the amounts of valuable oil or gas that can be produced. One way to avoid such spilling of oil and/or gas and to better protect the environment is described by A. Tengirsek and N Mohamed, in "Towards Zero Flaring", *Middle East & Asia Reservoir Review*, Number 3, 2002, pp. 5-9, and comprises reinjecting the oil containing the spent acid into the well, which reduces oil flaring by 38% to 65%.

Further investigations have now been carried out directed at the optimization of processes to treat subterranean formations. The purpose of the invention is to provide an effective and efficient process to not only get more oil and/or gas from the subterranean formation but to also produce oil and/or gas in a purer and more isolated form, i.e. to provide a process in which the level of impurities that play a role in the production process is much lower in the desired final oil or gas-based product, to better avoid spilling gas and/or oil, and to better protect the environment.

The present invention now provides an improved process to produce oil or gas from a subterranean formation using chelating agents having an unexpected, simple step of after-treating the streams leaving the subterranean formation after the treatment step.

Accordingly, the present invention covers a two-step process to produce oil or gas from a subterranean formation wherein in a first step the subterranean formation is treated with an aqueous composition containing a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine N,N',N'-triacetic acid or a salt thereof (HEDTA) and wherein, in a next step, in the outlet streams from the subterranean formation containing an aqueous phase and a non-aqueous phase the aqueous phase is separated from the non-aqueous phase.

For the purpose of this disclosure the term emulsion is defined as a dispersion (droplets) of one liquid in another immiscible liquid. The phase that is present in the form of droplets is the dispersed phase, and the phase in which the droplets are suspended is called the continuous phase. For produced oilfield and gasfield streams, which often are emulsions, one of the phases is aqueous and the other phase generally contains the crude oil or gas. The amount of water that emulsifies with the non-aqueous phase containing e.g. the crude oil varies widely from facility to facility. It can be less than 1% and sometimes greater than 80%.

Surprisingly, it was found that the separation of the aqueous phase from the non-aqueous phase in the process of the present invention is much faster and easier than with a similar process in which the fluid contains a state of the art acid, like for example HCl, as the aqueous phase containing the acidic chelating agent and/or, more importantly, the spent chelating agent quickly and clearly separates itself from the non-aqueous phase containing the crude oil or gas, i.e. there is no disturbing effect from any of the components present in the composition used in the present invention on the interface between the aqueous and the non-aqueous layer. This not only results in a reduced need for chemical or heat treatments, but more importantly makes that no fractions of produced oil or gas need to be dumped or flared because they contain too high amounts of contaminating components to fulfill the crude specifications.

Further, it was established that when in some embodiments when performing the process of the invention wherein small amounts of the chelating agents remain in the valuable oil and/or gas phase, these chelating agent remainders do not cause the quality of the oil and/or gas to deteriorate as a fuel, i.e. the oil and or gas products stay within the crude specifications. Thus, unlike remainders of many other acids normally used in treating subterranean formations, after applying the process of the present invention, any minimal amounts of chelating agent can simply stay in the crudes. So, also for this reason no further steps to separate, dispose of, dump or flare the crude oil or gas are necessary, making the process of the present invention very attractive economically in addition.

In addition, it was found that the chelating agent in the aqueous phase in the composition of this invention can reduce the corrosive character or other detrimental effects in the refinery equipment caused by the inorganic salts from the crude oil.

The separation can be achieved by any, or a combination, of the following methods: (i) adding a chemical demulsifier, (ii) increasing the temperature of the emulsion, (iii) applying electrostatic fields that promote coalescence, (iv) reducing the flow velocity that allows gravitational separation of oil, water, and gas.

Preferably, the separation is performed by gravitational separation of the phases (iv), by the addition of a demulsifier (i), or by a combination of both (i) and (iv), most preferably, the separation is done by gravitational separation (iv).

Demulsification methods in the embodiments of this invention are application-specific because of the wide variety of crude oils, brines, separation equipment, chemical demulsifiers, and product specifications.

In another preferred embodiment, the separation is achieved by application of heat and an appropriate chemical demulsifier to promote destabilization, followed by a settling time with electrostatic grids to promote gravitational separation.

Separation is generally accomplished in large-volume two and three-phase separators, free water knockout drums, settling tanks, and desalters.

The non-aqueous phase generally is the phase containing the crude oil or gas product and in many embodiments is a non-aqueous (hydrophobic) liquid containing the crude oil or gas. However, in some embodiments it may also be a gas phase, especially when the process involves the production of gas. The aqueous phase generally contains the spent chelating agent acid, i.e. the chelating agent which has reacted with calcium, magnesium cations or metal cations, like aluminium, iron, barium, strontium, zinc as often found in subterranean formations, to give a dissolved chelating agent salt or complex.

In many embodiments, the separation step is based on the specific gravity difference between the non-aqueous and the aqueous phase. Based on that criterion, most of the suspended solids will settle to the bottom of the separator as a sediment layer, the non-aqueous phase will rise to top of the separator, and the aqueous phase will be the middle layer between the non-aqueous phase on top and the solids on the bottom.

In some embodiments, the aqueous layer can be subjected to a further treatment step, for instance for further removal of any residual oil or for a treatment for removal of undesirable dissolved chemical compounds.

The composition used in the process of the present invention may have an acidic pH, as further specified below.

In such case, in a preferred embodiment the first step of treating the subterranean formation when indeed an aqueous composition having an acidic pH is used, is a matrix-acidizing treatment.

In one other preferred embodiment, the present invention provides a process for treating a subterranean formation comprising an additional step of fracturing the formation next to the step of introducing the aqueous composition containing a chelating agent selected from the group of glutamic acid N,N-diacetic acid or a salt thereof (GLDA), aspartic acid N,N-diacetic acid or a salt thereof (ASDA), methylglycine N,N diacetic acid or a salt thereof (MGDA), and N-hydroxyethyl ethylenediamine N,N',N'-triacetic acid or a salt thereof (HEDTA) into the formation for the treatment step, wherein the fracturing step can take place before introducing the composition into the formation, while introducing the composition into the formation or subsequent to introducing the composition into the formation.

If fracturing takes place while introducing the composition into the formation, the composition containing GLDA, ASDA, MGDA and/or HEDTA can function as both the treatment and the fracturing fluid and will be introduced into the formation under a pressure above the fracture pressure of the treated formation. In this way, the process has a real economic benefit as instead of two fluids, only one fluid needs to be used. In embodiments wherein the fluid has an acidic pH, such a process is referred to as acid-fracturing, wherein the fluid containing GLDA, ASDA, MGDA and/or HEDTA acidizes the fractured formation.

In addition, the above process can be used in acid-refracturing of oil and gas wells previously fractured by HCl or another material.

The invention in addition provides the process of introducing the above compositions but also introducing kits of parts containing the same components as the composition in separate parts into subterranean formations to treat the formations. When kits of parts are used, the composition from one part of the kit containing the chelating agent is introduced into the formation for the main treatment step, while that from the other part containing one or more of the further additives, such as for example a surfactant or mutual solvent, is introduced for a preflush and/or postflush step.

Though preferably the formation is treated with a fluid containing a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine-N,N',N'-triacetic acid or a salt thereof (HEDTA), in embodiments it may also be a foamed composition of a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine-N,N',N'-triacetic acid or a salt thereof (HEDTA), a foaming agent, and at least 50 vol % on the basis of total volume of the foam of a gas, or a viscosified composition containing a chelating agent selected from the group of glutamic acid N,N-diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine-N,N',N'-triacetic acid or a salt thereof (HEDTA), and at least 0.01 wt % on total weight of the composition of a viscosifying agent.

Viscosified composition is defined in this application as a composition that has a higher viscosity than the same composition without a viscosifying agent when using a Grace 5600 HPHT rheometer equipped with Hastelloy C-276 internals at 20° C. or another relevant temperature as specified herein. A B5 bob was used for this application, which required a sample volume of 52 cm$^3$. The test was applied by varying the shear rate from 0.1 to 1,000 s$^{-1}$. Preferably, the viscosity of the viscosified composition is higher than 10 cp, more preferably more than 50 cp at a shear rate of 100 s$^{-1}$.

The subterranean formation in one embodiment can be a carbonate formation, a shale formation, or a sandstone formation and for the viscosified or foamed compositions in a preferred embodiment it is any of these formations with a high permeability ratio (>6D).

The term treating in this application is intended to cover any treatment of the formation with the composition. It specifically covers treating the formation with the composition to achieve at least one of (i) an increased permeability, (ii) the removal of small particles, and (iii) the removal of inorganic scale, and so enhance the well performance and enable an increased production of oil and/or gas from the formation. At the same time it may cover cleaning of the wellbore and descaling of the oil/gas production well and production equipment.

In one embodiment, when introducing the composition into the formation not only treatment of the formation takes place, but the same composition can also act as a composition to remove at least part of a filter cake that may be present in such formation.

In preferred embodiments, the compositions contain, besides an effective amount of glutamic acid N,N-diacetic acid or a salt thereof (GLDA), aspartic acid N,N-diacetic acid or a salt thereof (ASDA), methylglycine N,N-diacetic acid or a salt thereof (MGDA) and/or N-hydroxyethyl ethylenediamine N,N',N'-triacetic acid or a salt thereof (HEDTA), both a corrosion inhibitor and a surfactant. Surprisingly, it was found that in these compositions there is a good balance of properties.

The GLDA, ASDA, MGDA and/or HEDTA are preferably present in the composition or in the composition in the kit of parts in an amount of between 5 and 30 wt %, even more preferably of between 10 and 30 wt %, most preferably 15 and 25 wt %, on total composition.

Salts of GLDA, ASDA, MGDA and/or HEDTA that can be used are their alkali metal, alkaline earth metal, or ammonium full and partial salts. Also mixed salts containing different cations can be used. Preferably, the sodium, potassium, and ammonium full or partial salts of GLDA, ASDA, MGDA and/or HEDTA are used.

In a preferred embodiment the compositions of the invention (as well as the compositions in the kits of parts) contain ASDA, HEDTA and/or GLDA, even more preferred embodiments contain ASDA and/or GLDA, most preferred GLDA, as these compositions were found to give the better permeability enhancement and a faster separation of the aqueous and non-aqueous phases after production.

The compositions of the invention (as well as the compositions in the kits of parts) are aqueous fluids, i.e. they preferably contain water as a solvent for the other ingredients, wherein water can be e.g. fresh water, produced water or seawater, though other solvents may be added as well, as further explained below.

In one embodiment, the pH of the compositions of the invention and the compositions in the kits of parts of the invention can range from 1.7 to 14.

Preferably, however, it is between 2 and 13, as in the very acidic range and the very alkaline range, some undesired side effects may be caused by the compositions in the formation, such as too fast dissolution giving excessive $CO_2$ formation or an increased risk of reprecipitation. For a better carbonate dissolving capacity it is preferably acidic. On the other hand, it must be realized that highly acidic solutions are more expensive to prepare. Consequently, the solution even more preferably has a pH of 2 to 8, even more preferably between 3 and 8, and most preferably between 3.5 and 6.

The compositions and the kits of parts of the invention may be free of, but preferably contain more than 0 wt % up to 2 wt %, more preferably 0.1-1 wt %, even more preferably 0.1-0.5 wt %, of corrosion inhibitor. The compositions may be free of, but preferably contain more than 0 and up to 2 wt % of surfactant, more preferably 0.1-2 wt %, even more preferably 0.1-1 volume %, each amount being based upon the total weight or volume of the composition.

When using the compositions and kits of parts of the invention in treating a subterranean formation to increase the permeability thereof, remove small particles therefrom and/or remove inorganic scale therefrom and so enhance the production of oil and/or gas from the formation, or in cleaning of the wellbore and/or descaling of the oil/gas production well and production equipment in the production of oil and/or gas from a subterranean formation, the composition is preferably used at a temperature of between 35 and 400° F. (about 2 and 204° C.), more preferably between 77 and 400° F. (about 25 and 204° C.), even more preferably between 77 and 350° F. (about 25 and 177° C.), most preferably between 150 and 300° F. (about 65 and 149° C.).

The use of the compositions and kits of parts in the treatment of formations is preferably at a pressure between atmospheric pressure and fracture pressure, wherein fracture pressure is defined as the pressure above which injection of compositions will cause the formation to fracture hydraulically. However, use at a higher pressure than fracture pressure is also possible, the process then includes fracturing of the formation. A person skilled in the art will understand that the fracture pressure depends on parameters such as type, depth of the formation, and downhole stresses, and can be different for each reservoir.

In one embodiment, the subterranean formations may be chosen from the group of carbonate formations, like chalk, dolomite or calcite formations, sandstone formations or shale formations, wherein the sandstone and shale formations in preferred embodiments contain calcium carbonate. In addition, some of the formations may be illitic formations, i.e. they contain an amount of illite.

When a foamed composition is used, the gas is preferably present in the foam in an amount of between 50 and 99 vol %, more preferably between 50 and 80 vol %, even more preferably 60-70 vol % on total foam volume.

The foaming agent in one embodiment is a surfactant. Preferably, the foaming agent is a water-soluble surfactant, as the foams of the invention are preferably water-based. Water-soluble means for this invention, soluble in an amount of at least 2 g/l of water.

The foaming agent in one embodiment is used in an amount of between 10 ppm and 200,000 ppm based on the total weight of the foam, preferably between 10 ppm and 100,000 ppm, even more preferably 100 and 50,000 ppm, most preferably between 100 and 10,000 ppm.

The gas in one embodiment is selected from the group of $N_2$, CO, $CO_2$, natural gas, oxygen or mixtures thereof, like air. Preferably, $N_2$, $CO_2$, air, or natural gas is used.

Foam-forming surfactants include anionic, cationic, amphoteric, and nonionic surfactants in increasing order of performance. Foaming agents include, but are not limited to, ethoxylated alcohols, polysaccharides, ethoxylated fatty amines, amine oxides, glucosides, sulfonates, and quaternary ammonium salts.

When the composition is a foamed composition, foam formation can be achieved along several routes. In one embodiment, a suitable foam is obtained by including a mixture of surfactants as foaming agents in the solution containing the chelating agent. Suitable surfactants may be anionic, cationic, amphoteric or nonionic in nature, or their mixtures. The person skilled in the art is fully aware that in the case of surfactants having opposite charges, a non-stoichiometric ratio must be chosen. Preferably, the molar ratio is higher than 3 to 1. More preferably, it is higher than 5:1 and most preferably, it is higher than 10:1. It is also preferred that the surfactant mixture is soluble in water (i.e. in an amount of at least 2 g/l water, preferably at least 10 g/l of water). It is more preferred that the surfactant mixture is soluble in the aqueous system containing up to 5% on total weight of a chelating agent. Suitable surfactant mixtures may be mixtures of surfactants which are all soluble in the described solutions. However, surfactant mixtures may also contain one or more (co-)surfactants which are insoluble in the described solutions. It is known to the person skilled in the art that the portion of insoluble surfactants is bound to limits. When expressed in weight ratios, the preferred ratio of insoluble to soluble surfactant is less than 2. More preferably, it is less than 1 and most preferably, it is less than ⅓ (one third).

In another embodiment, the foamed composition of the present invention contains a foam extender. Foam extenders are known in the art and are for example disclosed in WO 2007/020592.

When the composition used for the treatment is a viscosified composition, the viscosifying agent is preferably present in an amount of between 0.01 and 3 wt %, more preferably between 0.01 and 2 wt %, even more preferably between 0.05 and 1.5 wt % on total weight of the viscosified composition.

When the composition is a viscosified composition, the viscosifying agent in one embodiment can be chosen from carbohydrates, or from polysaccharides such as cellulosic derivatives, guar or guar derivatives, xanthan, carrageenan, starch biopolymers, several gums, polyacrylamides, polyacrylates, viscoelastic surfactants [e.g., amide oxides, carboxybetaines].

In an even more preferred embodiment, the composition of the invention contains a combination of a foaming agent and a viscosifying agent, the foaming agent and the viscosifying agent being chosen from the group of foaming agents and viscosifying agents as further specified in this document.

In yet another preferred embodiment, the foaming agent and/or the viscosifying agent are present together with an additional surfactant, which can be a nonionic, anionic, cationic, or amphoteric surfactant.

In yet another embodiment, the viscosified composition of the present invention contains a crosslinking agent which is capable of crosslinking the viscosifying agent and therefore can improve the properties of the viscosified composition and, in embodiments wherein the foam also contains a viscosifying agent, also the foam. Crosslinking agents are known in the art and are for example disclosed in WO 2007/020592.

As already briefly summarized above, the viscosifying agents include chemical species which are soluble, at least partially soluble and/or insoluble in the chelating agent-containing starting fluid. The viscosifiers may also include various insoluble or partially soluble organic and/or inorganic fibres and/or particulates, e.g., dispersed clay, dispersed minerals, and the like, which are known in the art to increase viscosity. Suitable viscosifiers further include various organic and/or inorganic polymeric species including polymer viscosifying agents, especially metal-crosslinked polymers. Suitable polymers for making the metal-crosslinked polymer viscosifiers include, for example, polysaccharides, e.g., substituted galactomannans, such as guar gums, high-molecular weight polysaccharides composed of mannose and galactose sugars, or guar derivatives such as hydroxypropyl guar (HPG), carboxymethyl hydroxypropyl guar (CMHPG), and carboxymethyl guar (CMG), hydrophobically modified guars, guar-containing compounds, and synthetic polymers. Crosslinking agents which include boron, titanium, zirconium and/or aluminium complexes are preferably used to increase the effective molecular weight of the polymers and make them better suited for use as viscosity-increasing agents, especially in high-temperature wells. Other suitable classes of water-soluble polymers effective as viscosifiers include polyvinyl alcohols at various levels of hydrolysis, polyvinyl polymers, polymethacrylamides, cellulose ethers, lignosulfonates, and ammonium, alkali metal, and alkaline earth salts thereof, polyethylene imines, polydiallyl dimethyl ammonium chloride, polyamines like copolymers of dimethylamine and epichlorohydrin, copolymers of acrylamide and cationic monomers, like diallyl dimethyl ammonium chloride (DADMAC) or acryloyloxyethyl trimethyl ammonium chloride, copolymers of acrylamide containing anionic as well as cationic groups. More specific examples of other typical water-soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkylene oxides, other galactomannans, heteropolysaccharides obtained by the fermentation of starch-derived sugar and ammonium and alkali metal salts thereof. Cellulose derivatives, including hydroxyethyl cellulose (HEC), hydroxypropyl cellulose (HPC), carboxymethylhydroxyethyl cellulose (CMHEC) and/or carboxymethyl cellulose (CMC), with or without crosslinkers, xanthan, diutan, and scleroglucan are also preferred.

Still other viscosifiers include clay-based viscosifiers, platy clays, like bentonites, hectorites or laponites, and small fibrous clays such as the polygorskites (attapulgite and sepiolite). When using polymer-containing viscosifiers as further viscosifiers, the viscosifiers may be used in an amount of up to 5% by weight of the compositions of the invention.

The composition may contain other additives that improve the functionality of the stimulation action and minimize the risk of damage as a consequence of the said treatment, as is known to anyone skilled in the art.

The composition of the invention may in addition contain one or more of the group of anti-sludge agents, surfactants, corrosion inhibitors, mutual solvents, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, consolidating agents (such as resins and/or tackifiers), combinations thereof, or the like.

The mutual solvent is a chemical liquid additive that is soluble in oil, water, acids (often HCl-based), and other well fluids (see also http://www.glossary.oilfield.slb.com). In many cases the mutal solvent ensures that the oil and water-based liquids, which ordinarily are immiscible liquids, combine with each other, and in preferred embodiments form a clear solution. Mutual solvents are routinely used in a range of applications, controlling the wettability of contact surfaces before, during and/or after a treatment, and preventing or breaking up emulsions. Mutual solvents are used, as insoluble formation fines pick up organic film from crude oil. These particles are partially oil-wet and partially water-wet. This causes them to collect materials at any oil-water interface, which can stabilize various oil-water emulsions. Mutual solvents remove organic films leaving them water-wet, thus emulsions and particle plugging are eliminated. If a mutual solvent is employed, it is preferably selected from the group which includes, but is not limited to, lower alcohols such as methanol, ethanol, 1-propanol, 2-propanol, and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through C10-esters, and substantially water/oil-soluble ketones, such as one or more C2-C10 ketones. The mutual solvent is preferably present in an amount of 1 to 50 wt % on total composition.

A preferred water/oil-soluble ketone is methyl ethyl ketone.

A preferred substantially water/oil-soluble alcohol is methanol.

A preferred substantially water/oil-soluble ester is methyl acetate.

A more preferred mutual solvent is ethylene glycol monobutyl ether, generally known as EGMBE The amount of glycol solvent in the solution is preferably about 1 wt % to about 10 wt %, more preferably between 3 and 5 wt %. More preferably, the ketone solvent may be present in an amount from 40 wt % to about 50 wt %; the substantially water-soluble alcohol may be present in an amount within the range of about 20 wt % to about 30 wt %; and the substantially water/oil-soluble ester may be present in an amount within the range of about 20 wt % to about 30 wt %, each amount being based upon the total weight of the solvent in the composition.

In one embodiment, the mutual solvent can be used as a preflush or postflush material, i.e. in such embodiment it will be introduced into the formation before or after the treatment with the composition.

The surfactant (water-wetting surfactants as well as surfactants used as foaming agent, viscosifying agent) can be any surfactant known in the art and includes anionic, cationic, amphoteric, and nonionic surfactants. The choice of surfactant is initially determined by the nature of the rock formation around the well. The application of cationic surfactants is best limited in the case of sandstone, while in the case of carbonate rock, anionic surfactants are not preferred. Hence, the surfactant (mixture) is preferably predominantly anionic in nature when the formation is a sandstone formation. When the formation is a carbonate formation, the surfactant (mixture) is preferably predominantly nonionic or cationic in nature, even more preferably predominantly cationic.

The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides, and the like, and mixtures thereof. Alkoxylated alcohols, preferably ethoxylated alcohols, optionally in combination with (alkyl) polyglycosides, are the most preferred nonionic surfactants.

The anionic surfactants may comprise any number of different compounds, including alkyl sulfates, alkyl sulfonates, alkylbenzene sulfonates, alkyl phosphates, alkyl phosphonates, alkyl sulfosuccinates.

The amphoteric surfactants include hydrolyzed keratin, taurates, sultaines, phosphatidyl cholines, betaines, modified betaines, alkylamidobetaines (e.g., cocoamidopropyl betaine).

The cationic surfactants include alkyl amines, alkyl dimethylamines, alkyl trimethylamines (quaternary amines), alkyl diethanolamines, dialkyl amines, dialkyl dimethylamines, and less common classes based on phosphonium, sulfonium. In preferred embodiments, the cationic surfactants may comprise quaternary ammonium compounds (e.g., trimethyl tallow ammonium chloride, trimethyl coco ammonium chloride), derivatives thereof, and combinations thereof.

Examples of surfactants that are also foaming agents that may be utilized to foam and stabilize the treatment compositions of this invention include, but are not limited to, betaines, amine oxides, methyl ester sulfonates, alkylamidobetaines such as cocoamidopropyl betaine, alpha-olefin sulfonate, trimethyl tallow ammonium chloride, C8 to C22 alkyl ethoxylate sulfate, and trimethyl coco ammonium chloride.

The foaming agent, if used, is normally used in an amount of between 10 and 200,000 ppm based on the total weight of the composition, preferably between 100 and 10,000 ppm.

Suitable surfactants may be used in a liquid or solid form, like a powder, granule or particulate form.

Where used, the surfactants may be present in the composition in an amount sufficient to prevent incompatibility with formation fluids, other treatment fluids, or wellbore fluids at reservoir temperature.

In an embodiment where liquid surfactants are used, the surfactants are generally present in an amount in the range of from about 0.01% to about 5.0% by volume of the composition.

In one embodiment, the liquid surfactants are present in an amount in the range of from about 0.1% to about 2.0% by volume of the composition, more preferably between 0.1 and 1 vol %.

In embodiments where powdered surfactants are used, the surfactants may be present in an amount in the range of from about 0.001% to about 0.5% by weight of the composition.

The antisludge agent can be chosen from the group of mineral and/or organic acids used to stimulate sandstone hydrocarbon bearing formations. The function of the acid is to dissolve acid-soluble materials so as to clean or enlarge the flow channels of the formation leading to the wellbore, allowing more oil and/or gas to flow to the wellbore.

Problems are caused by the interaction of the (usually concentrated, 20-28% HCl) stimulation acid and certain crude oils (e.g. asphaltic oils) in the formation to form sludge. Interaction studies between sludging crude oils and the introduced acid show that permanent, rigid solids are formed at the acid-oil interface when the aqueous phase is below a pH of about 4. No films are observed for non-sludging crudes with acid.

These sludges are usually reaction products formed between the acid and the high molecular weight hydrocarbons such as asphaltenes, resins, etc.

Methods for preventing or controlling sludge formation with its attendant flow problems during the acidization of crude-containing formations include adding "anti-sludge" agents to prevent or reduce the rate of formation of crude oil sludge, which anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

The carrier fluids are aqueous solutions which in certain embodiments contain a Bronsted acid to keep the pH in the desired range and/or contain an inorganic salt, preferably NaCl or KCl.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

In general, the most successful inhibitor formulations for organic acids and chelating agents contain amines, reduced sulfur compounds or combinations of a nitrogen compound (amines, quats or polyfunctional compounds), and a sulfur compound. The amount of corrosion inhibitor is preferably less than 2 volume %, more preferably between 0.01 and 1 volume %, even more preferably between 0.1 and 1 volume % on total composition volume.

One or more corrosion inhibitor intensifiers may be added in conjunction with corrosion inhibitors which intensifiers extend the performance range of the corrosion inhibitor, such as for example formic acid, potassium iodide, antimony chloride, or copper iodide.

One or more salts may be used as rheology modifiers to modify the rheological properties (e.g., viscosity and elastic properties) of the compositions. These salts may be organic or inorganic.

Examples of suitable organic salts include, but are not limited to, aromatic sulfonates and carboxylates (such as p-toluene sulfonate and naphthalene sulfonate), hydroxynaphthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethyl ammonium hydrochloride and tetramethyl ammonium chloride.

Examples of suitable inorganic salts include water-soluble potassium, sodium, and ammonium halide salts (such as potassium chloride and ammonium chloride), calcium chloride, calcium bromide, magnesium chloride, sodium formate, potassium formate, cesium formate, and zinc halide salts. A mixture of salts may also be used, but it should be noted that preferably chloride salts are mixed with chloride salts, bromide salts with bromide salts, and formate salts with formate salts.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, and the like. A mixture of salts may also be used in the brines, but it should be noted that preferably chloride salts are mixed with chloride salts, bromide salts with bromide salts, and formate salts with formate salts.

The brine chosen should be compatible with the formation and should have a sufficient density to provide the appropriate degree of well control.

Additional salts may be added to a water source, e.g., to provide a brine, and a resulting composition, in order to have a desired density.

The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops.

Preferred suitable brines may include seawater and/or formation brines.

Salts may optionally be included in the compositions of the present invention for many purposes, including for reasons related to compatibility of the composition with the formation and the formation fluids.

To determine whether a salt may be beneficially used for compatibility purposes, a compatibility test may be performed to identify potential compatibility problems.

From such tests, one of ordinary skill in the art will, with the benefit of this disclosure, be able to determine whether a salt should be included in a composition of the present invention.

Suitable salts include, but are not limited to, calcium chloride, sodium chloride, magnesium chloride, potassium chloride, sodium bromide, potassium bromide, ammonium chloride, sodium formate, potassium formate, cesium formate, and the like. A mixture of salts may also be used, but it should be noted that preferably chloride salts are mixed with chloride salts, bromide salts with bromide salts, and formate salts with formate salts.

The amount of salt to be added should be the amount necessary for the required density for formation compatibility, such as the amount necessary for the stability of clay minerals, taking into consideration the crystallization temperature of the brine, e.g., the temperature at which the salt precipitates from the brine as the temperature drops.

Salt may also be included to increase the viscosity of the composition and stabilize it, particularly at temperatures above 180° F. (about 82° C.).

Examples of suitable pH control additives which may optionally be included in the compositions of the present invention are acid compositions and/or bases.

A pH control additive may be necessary to maintain the pH of the composition at a desired level, e.g., to improve the effectiveness of certain breakers and to reduce corrosion on any metal present in the wellbore or formation, etc.

One of ordinary skill in the art will, with the benefit of this disclosure, be able to recognize a suitable pH for a particular application.

In one embodiment, the pH control additive may be an acid composition.

Examples of suitable acid compositions may comprise an acid, an acid-generating compound, and combinations thereof.

Any known acid may be suitable for use with the compositions of the present invention.

Examples of acids that may be suitable for use in the present invention include, but are not limited to, organic acids (e.g., formic acids, acetic acids, carbonic acids, citric acids, glycolic acids, lactic acids, ethylene diamine tetraacetic acid (EDTA), and the like), inorganic acids (e.g., hydrochloric acid, hydrofluoric acid, phosphonic acid, p-toluene sulfonic acid, and the like), and combinations thereof. Preferred acids are HCl (to an amount compatible with the illite content) and organic acids.

Examples of acid-generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(epsilon-caprolactones), poly(hydroxybutyrates), poly(anhydrides), or copolymers thereof.

Derivatives and combinations also may be suitable.

The term "copolymer" as used herein is not limited to the combination of two polymers, but includes any combination of polymers, e.g., terpolymers and the like.

Other suitable acid-generating compounds include: esters including, but not limited to, ethylene glycol monoformate, ethylene glycol diformate, diethylene glycol diformate, glyceryl monoformate, glyceryl diformate, glyceryl triformate, methylene glycol diformate, and formate esters of pentaerythritol.

The pH control additive also may comprise a base to elevate the pH of the composition.

Generally, a base may be used to elevate the pH of the mixture to greater than or equal to about 7.

Having the pH level at or above 7 may have a positive effect on a chosen breaker being used and may also inhibit the corrosion of any metals present in the wellbore or formation, such as tubing, screens, etc.

In addition, having a pH greater than 7 may also impart greater stability to the viscosity of the composition, thereby enhancing the length of time that viscosity can be maintained.

This could be beneficial in certain uses, such as in longer-term well control and in diverting.

Any known base that is compatible with the viscosifiers of the present invention can be used in the compositions of the present invention.

Examples of suitable bases include, but are not limited to, sodium hydroxide, potassium carbonate, potassium hydroxide, sodium carbonate, and sodium bicarbonate.

One of ordinary skill in the art will, with the benefit of this disclosure, recognize the suitable bases that may be used to achieve a desired pH elevation.

In some embodiments, the composition may optionally comprise a further chelating agent.

When added to the compositions of the present invention, the chelating agent may chelate any dissolved iron (or other divalent or trivalent cation) that may be present in the aqueous composition and prevent any undesired reactions being caused.

Such a chelating agent may, e.g., prevent such ions from crosslinking the gelling agent molecules.

Such crosslinking may be problematic because, inter alia, it may cause filtration problems, injection problems, and/or cause permeability problems once more.

Any suitable chelating agent may be used with the present invention.

Examples of suitable chelating agents include, but are not limited to, citric acid, nitrilotriacetic acid (NTA), any form of ethylene diamine tetraacetic acid (EDTA), diethylene triamine pentaacetic acid (DTPA), propylene diamine tetraacetic acid (PDTA), ethylene diamine-N,N"-di(hydroxyphenylacetic) acid (EDDHA), ethylene diamine-N,N"-di-(hydroxy-methylphenyl acetic acid (EDDHMA), ethanol diglycine (EDG), trans-1,2-cyclohexylene dinitrilotetraacetic acid (CDTA), glucoheptonic acid, gluconic acid, sodium citrate, phosphonic acid, salts thereof, and the like.

In some embodiments, the chelating agent may be a sodium, potassium or ammonium salt.

Generally, the chelating agent may be present in an amount sufficient to prevent undesired side effects of divalent or trivalent cations that may be present, and thus also functions as a scale inhibitor.

One of ordinary skill in the art will, with the benefit of this disclosure, be able to determine the proper concentration of a chelating agent for a particular application.

In some embodiments, the compositions of the present invention may contain bactericides or biocides, inter alia, to protect the subterranean formation as well as the composition from attack by bacteria. Such attacks can be problematic because they may lower the viscosity of the composition, resulting in poorer performance, such as poorer sand suspension properties, for example.

Any bactericides known in the art are suitable. Biocides and bactericides that protect against bacteria that may attack GLDA, ASDA, MGDA or HEDTA or sulfates are preferred.

An artisan of ordinary skill will, with the benefit of this disclosure, be able to identify a suitable bactericide and the proper concentration of such bactericide for a given application.

Examples of suitable bactericides and/or biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. In one embodiment, the bactericides are present in the composition in an amount in the range of from about 0.001% to about 1.0% by weight of the composition.

Compositions of the present invention also may comprise breakers capable of reducing the viscosity of the composition at a desired time.

Examples of such suitable breakers for compositions of the present invention include, but are not limited to, oxidizing agents such as sodium chlorites, sodium bromate, hypochlorites, perborate, persulfates, and peroxides, including organic peroxides.

Other suitable breakers include, but are not limited to, suitable acids and peroxide breakers, triethanol amine, as well as enzymes that may be effective in breaking.

The breakers can be used as is or encapsulated.

Examples of suitable acids may include, but are not limited to, hydrochloric acid, hydrofluoric acid, formic acid, acetic acid, citric acid, lactic acid, glycolic acid, etc., and combinations of these acids.

A breaker may be included in a composition of the present invention in an amount and form sufficient to achieve the desired viscosity reduction at a desired time.

The breaker may be formulated to provide a delayed break, if desired.

The compositions of the present invention also may comprise suitable fluid loss additives.

Such fluid loss additives may be particularly useful when a composition of the present invention is used in a fracturing application or in a fluid used to seal a formation against invasion of fluid from the wellbore.

Any fluid loss agent that is compatible with the compositions of the present invention is suitable for use in the present invention.

Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

Another example of a suitable fluid loss additive is one that comprises a degradable material.

Suitable examples of degradable materials include polysaccharides such as dextran or cellulose; chitins; chitosans; proteins; aliphatic polyesters; poly(lactides); poly(glycolides); poly(glycolide-co-lactides); poly(epsilon-caprolactones); poly(3-hydroxybutyrates); poly(3-hydroxybutyrate-co-hydroxyvalerates); poly(anhydrides); aliphatic poly (carbonates); poly(ortho esters); poly(amino acids); poly (ethylene oxides); poly(phosphazenes); derivatives thereof; or combinations thereof.

In some embodiments, a fluid loss additive may be included in an amount of about 5 to about 2,000 lbs/Mgal (about 600 to about 240,000 g/Mliter) of the composition.

In some embodiments, the fluid loss additive may be included in an amount from about 10 to about 50 lbs/Mgal (about 1,200 to about 6,000 g/Mliter) of the composition.

In certain embodiments, a stabilizer may optionally be included in the compositions of the present invention.

It may be particularly advantageous to include a stabilizer if a chosen composition is experiencing viscosity degradation.

One example of a situation where a stabilizer might be beneficial is where the BHT (bottom hole temperature) of the wellbore is sufficient to break the composition by itself without the use of a breaker.

Suitable stabilizers include, but are not limited to, sodium thiosulfate, methanol, and salts such as formate salts and potassium or sodium chloride.

Such stabilizers may be useful when the compositions of the present invention are utilized in a subterranean formation having a temperature above about 200° F. (about 93° C.). If included, a stabilizer may be added in an amount of from about 1 to about 50 lbs/Mgal (about 120 to about 6,000 g/Mliter) of composition.

Scale inhibitors may be added to the compositions of the present invention, for example, when such compositions are not particularly compatible with the formation waters in the formation in which they are used.

These scale inhibitors may include water-soluble organic molecules with carboxylic acid, aspartic acid, maleic acids, sulfonic acids, phosphonic acid, and phosphate ester groups including copolymers, ter-polymers, grafted copolymers, and derivatives thereof.

Examples of such compounds include aliphatic phosphonic acids such as diethylene triamine penta (methylene phosphonate) and polymeric species such as polyvinyl sulfonate.

The scale inhibitor may be in the form of the free acid but is preferably in the form of mono- and polyvalent cation salts such as Na, K, Al, Fe, Ca, Mg, $NH_4$. Any scale inhibitor that is compatible with the composition in which it will be used is suitable for use in the present invention.

Suitable amounts of scale inhibitors that may be included in the compositions of the present invention may range from about 0.05 to 100 gallons per about 1,000 gallons (i.e. 0.05 to 100 liters per 1,000 liters) of the composition.

Any particulates such as proppant, gravel that are commonly used in subterranean operations in sandstone formations (e.g., sand, gravel, bauxite, ceramic materials, glass materials, wood, plant and vegetable matter, nut hulls, walnut hulls, cotton seed hulls, cement, fly ash, fibrous materials, composite particulates, hollow spheres and/or porous proppant), as well as any particulates such as fibres that are commonly used in subterranean operations in carbonate formations, may be used in the present invention, as may polymeric materials, such as polyglycolic acids and polylactic acids.

It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In some embodiments, coated particulates may be suitable for use in the compositions of the present invention. It should be noted that many particulates also act as diverting agents. Further diverting agents are viscoelastic surfactants and in-situ gelled fluids.

Oxygen scavengers may be needed to enhance the thermal stability of the GLDA, ASDA, MGDA or HEDTA. Examples thereof are sulfites and ethorbates.

Friction reducers can be added in an amount of up to 0.2 vol %. Suitable examples are viscoelastic surfactants and enlarged molecular weight polymers.

Crosslinkers can be chosen from the group of multivalent cations that can crosslink polymers such as Al, Fe, B, Ti, Cr, and Zr, or organic crosslinkers such as polyethylene amides, formaldehyde.

Sulfide scavengers can suitably be an aldehyde or ketone. Viscoelastic surfactants can be chosen from the group of amine oxides or carboxyl betaine-based surfactants.

High-temperature applications may benefit from the presence of an oxygen scavenger in an amount of less than about 2 vol % of the solution.

In the process of the invention the composition that is flooded back from the formation and separated off, can be recycled.

It must be realized, however, that GLDA, ASDA and MGDA, being biodegradable chelating agents, are not recyclable to the full extent.

EXAMPLES

Materials Used

GLDA, HEDTA, and ASDA were obtained from AkzoNobel Functional Chemicals. Oil 1 was a medium weight crude oil with an American Petroleum Institute (API) gravity of 30-31° API and Oil 2 and Oil 3 were light crude oils with an American Petroleum Institute (API) gravity of 40-50° API. HCl was obtained from Aldrich.

4 solutions were prepared: 1) 20 wt % GLDA in water having a pH of about 3.8, 2) 20 wt % HEDTA in water having a pH of about 3.8, 3) 20 wt % ASDA in water having a pH of about 3.8, and 4) 15 wt % HCl in water. These solutions were used as such (non-neutralized) or as neutralized with $CaCO_3$ solutions in the tests below.

The neutralized solutions were prepared by adding $CaCO_3$ to mimic spent acid solutions as obtained after a subterranean formation treatment. To neutralize the solutions, 2.35 grams of $CaCO_3$ were used (purity >99.9%). This quantity was determined as "X" for the tests described in Example 2 and Example 4.

Example 1

Oil 1 and Non-Neutralized Solutions at Room Temperature 75 ml of oil 1 were added to a plastic beaker and then 75 ml of the GLDA, HCl or HEDTA solutions were added on top. The sample was then stirred using an UltraTurrax at 10,000 rpm for 5 minutes at 70° F. (20° C.). Immediately after stirring, the sample was poured on a 100 ml graduated cylinder and data was acquired over time measuring the volume of the aqueous phase separated from the emulsion at 70° F. (20° C.). Full (100%) separation would result in an aqueous layer of 50 ml. The remaining emulsion was kept in a closed vessel.

Data was acquired at 10, 20, 30, 60, 120, 180 minutes and after 72 hours.

The results are summarized in Table 1 and FIG. 1 and show that the GLDA-based solution separates from the oil phase within 20 minutes, whereas 15% HCl shows no sign of separation within the time frame of the experiment. Additionally, the GLDA-based solution separates more completely from the oil phase than HEDTA, 78% separation for GLDA and 14% separation for HEDTA.

TABLE 1

Results obtained for the separation of crude oil 1 and the non-neutralized solutions

| Time (min) | HCl 15 wt % ml aqueous phase | GLDA 20 wt % ml aqueous phase | HEDTA 20 wt % ml aqueous phase |
|---|---|---|---|
| 0 | 0 | 0 | 0 |
| 10 | 0 | 12 | 5 |
| 20 | 0 | 38 | 7 |
| 30 | 0 | 39 | 7 |
| 60 | 0 | 39 | 7 |
| 120 | 0 | 39 | 7 |
| 180 | 0 | 39 | 7 |
| 4,320 | 2 | 39 | 7 |

Example 2

Oil 1 and Neutralized Solutions at Room Temperature

Figure 2:
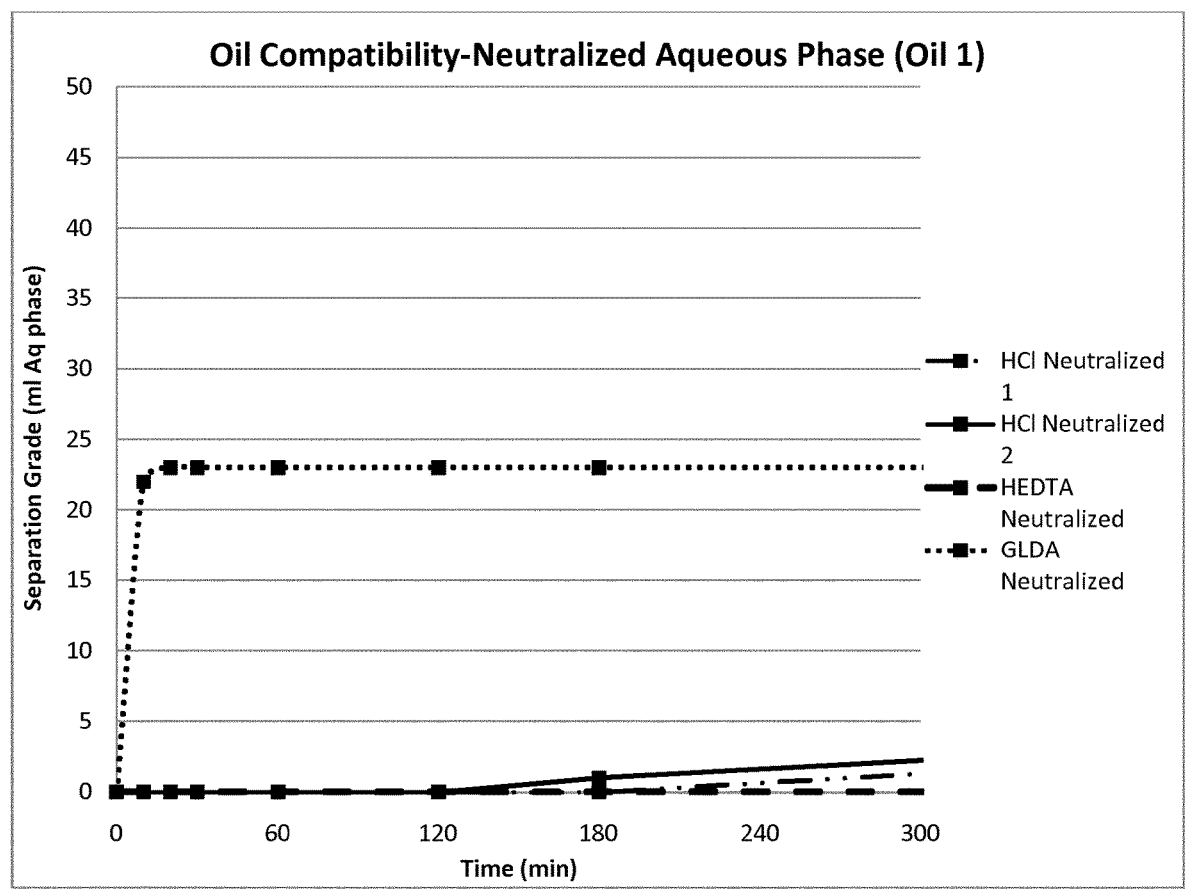

For this series of experiments, the aqueous phases used were:

GLDA 20 wt %, neutralized with "X" grams of $CaCO_3$
HCl 15 wt %, neutralized with "X" grams of $CaCO_3$
HEDTA 20 wt %, neutralized with "X" grams of $CaCO_3$ 75 ml of oil 1 were added to a plastic beaker and then 75 ml of the neutralized aqueous phase were added on top. The sample was then stirred using an UltraTurrax at 10,000 rpm for 5 minutes at 70° F. (20° C.). Immediately after stirring, the sample was poured on a 100 ml graduated cylinder and data was acquired over time measuring the volume of the aqueous phase separated from the emulsion at 70° F. (20° C.). The remaining emulsion was kept in a closed vessel. The results are summarized in Table 2 and shown in FIG. 2. Also in the case of the neutralized solutions the GLDA-based solution separated within 10 minutes after stirring was stopped, resulting in a 46% separation. The state of the art 15% HCl solution did not separate during the first 2 to 3 hours.

TABLE 2

Results obtained for the separation of oil 1 and the neutralized solutions

| Time (min) | HCl Neutralized X g CaCO$_3$ ml aqueous phase | GLDA Neutralized X g CaCO$_3$ ml aqueous phase |
|---|---|---|
| 0 | 0 | 0 |
| 10 | 0 | 22 |
| 20 | 0 | 23 |
| 30 | 0 | 23 |
| 60 | 0 | 23 |
| 120 | 0 | 23 |
| 180 | 1 | 23 |

Example 3

Oil 1 and Non-Neutralized Solutions at High Temperature 75 ml of oil 1 were added to a plastic beaker and then 75 ml of the GLDA, HCl or HEDTA solutions were added on top. The plastic beakers with the samples were placed in a water thermic bath at a temperature of 140° F. (60° C.) until temperature of the mix was stable. The samples were then stirred using an UltraTurrax at 10,000 rpm for 5 minutes. Immediately after stirring, the sample was poured on a 100 ml graduated cylinder and data was acquired over time measuring the volume of the aqueous phase separated from the emulsion at 140° F. (60° C.). The remaining emulsion was kept in a closed vessel.

Data was acquired at 10, 20, 30, 60, 120, 180 minutes and after 72 hours.

Figure 3:
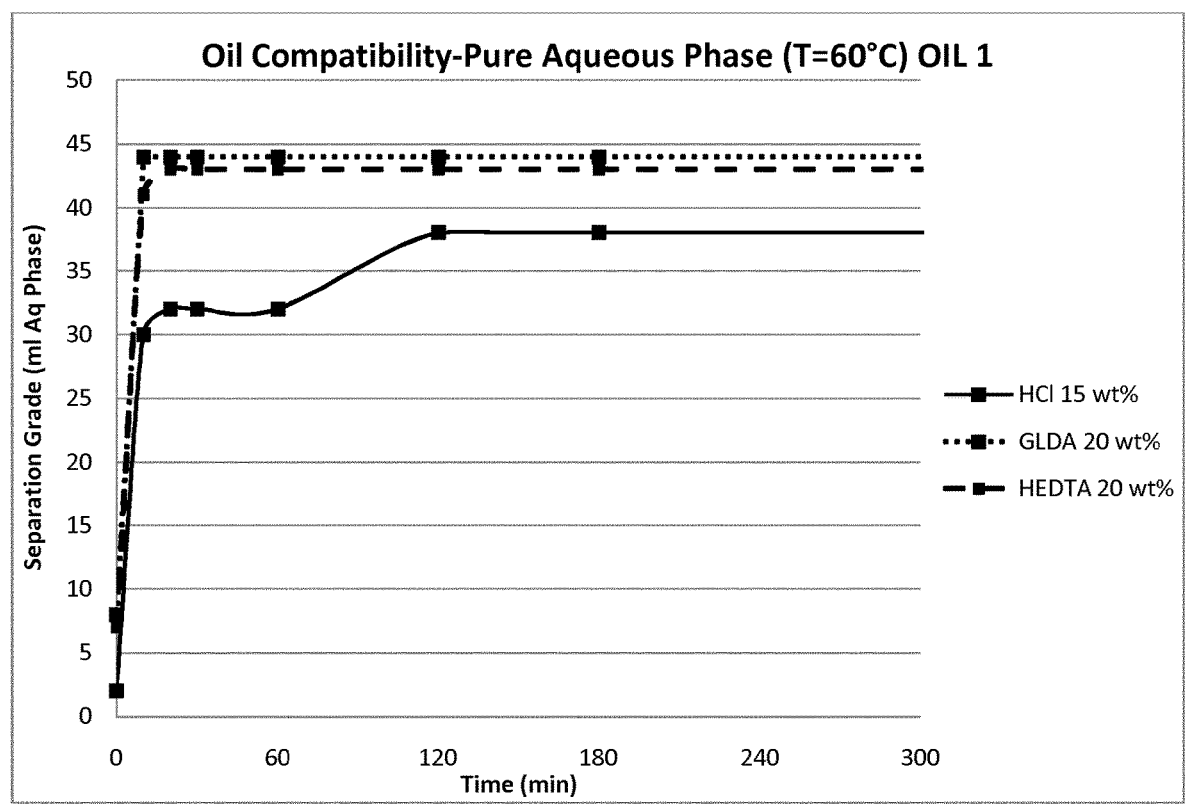

The results are summarized in Table 3 and FIG. 3 and show that the GLDA-based solution separates from the oil phase within 10 minutes, whereas 15% HCl shows the maximum grade of separation after 2 hours of starting the experiment.

Additionally, the GLDA-based solution separates more completely from the oil phase than HEDTA, 88% separation for GLDA and 86% separation for HEDTA.

TABLE 3

Results obtained for the separation of oil 1 and the solutions

| Time (min) | HCl 15 wt % ml aqueous phase | GLDA 20 wt % ml aqueous phase | HEDTA 20 wt % ml aqueous phase |
|---|---|---|---|
| 0 | 2 | 8 | 7 |
| 10 | 30 | 44 | 41 |
| 20 | 32 | 44 | 43 |
| 30 | 32 | 44 | 43 |
| 60 | 32 | 44 | 43 |
| 120 | 38 | 44 | 43 |

TABLE 3-continued

Results obtained for the separation of oil 1 and the solutions

| Time (min) | HCl 15 wt % ml aqueous phase | GLDA 20 wt % ml aqueous phase | HEDTA 20 wt % ml aqueous phase |
|---|---|---|---|
| 180 | 38 | 44 | 43 |
| 4,320 | 38 | 44 | 43 |

Example 4

Oil 1 and Neutralized Solutions at High Temperature

GLDA 20 wt %, neutralized with "X" grams of CaCO$_3$
HCl 15 wt %, neutralized with "X" grams of CaCO$_3$
HEDTA 20 wt %, neutralized with "X" grams of CaCO$_3$ 75 ml of oil 1 were added to a plastic beaker and then 75 ml of the GLDA, HCl or HEDTA solutions were added on top. The plastic beakers with the samples were placed in a water thermic bath at a temperature of 140° F. (60° C.) until the temperature of the mix was stable. The samples were then stirred using an UltraTurrax at 10,000 rpm for 5 minutes. Immediately after stirring, the sample was poured on a 100 ml graduated cylinder and data was acquired over time measuring the volume of the aqueous phase separated from the emulsion at 140° F. (60° C.).

The remaining emulsion was kept in a closed vessel.

Data was acquired at 10, 20, 30, 60, 120, 180 minutes and after 72 hours.

Figure 4:
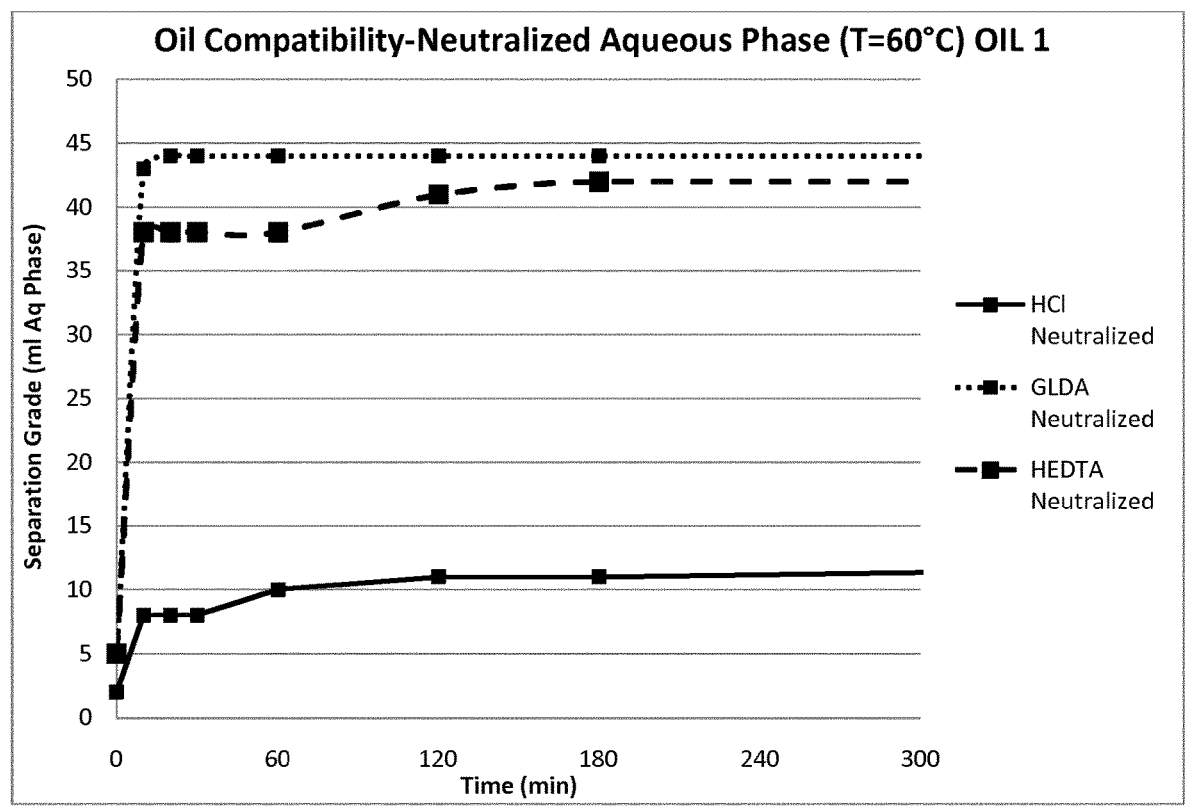

The results are summarized in Table 4 and FIG. 4 and show that the GLDA-based solution separates from the oil phase within 10 to 20 minutes, whereas 15% HCl shows a very slow separation rate after 72 hours of starting the experiment.

Additionally, the GLDA-based solution separates more completely from the oil phase than HEDTA, 88% separation for GLDA and 84% separation for HEDTA.

TABLE 4

Results obtained for the separation of oil 1 and the neutralized solutions at high temperature

| Time (min) | HCl Neutralized X g CaCO$_3$ ml aqueous phase | GLDA Neutralized X g CaCO$_3$ ml aqueous phase | HEDTA Neutralized X g CaCO$_3$ ml aqueous phase |
|---|---|---|---|
| 0 | 2 | 5 | 5 |
| 10 | 8 | 43 | 38 |
| 20 | 8 | 44 | 38 |
| 30 | 8 | 44 | 38 |
| 60 | 10 | 44 | 38 |
| 120 | 11 | 44 | 41 |
| 180 | 11 | 44 | 42 |
| 4,320 | 23 | 44 | 42 |

Example 5

Oil 2 and Neutralized Solutions at Room Temperature

For this series of experiments, the aqueous phases used were:
GLDA 20 wt %, neutralized with "X" grams of CaCO$_3$ GLDA 20 wt %, neutralized with "½X" grams of $CaCO_3$
HCl 15 wt %, neutralized with "X" grams of $CaCO_3$
HEDTA 20 wt %, neutralized with "X" grams of $CaCO_3$
ASDA 20 wt %, neutralized with "X" grams of $CaCO_3$ 75 ml of oil 2 were added to a plastic beaker and then 75 ml of the neutralized aqueous phase were added on top. The sample was then stirred using an UltraTurrax at 10,000 rpm for 5 minutes at 70° F. (20° C.). Immediately after stirring, the sample was poured on a 100 ml graduated cylinder and data was acquired over time measuring the volume of the aqueous phase separated from the emulsion at 70° F. (20° C.). The remaining emulsion was kept in a closed vessel.

Figure 5:
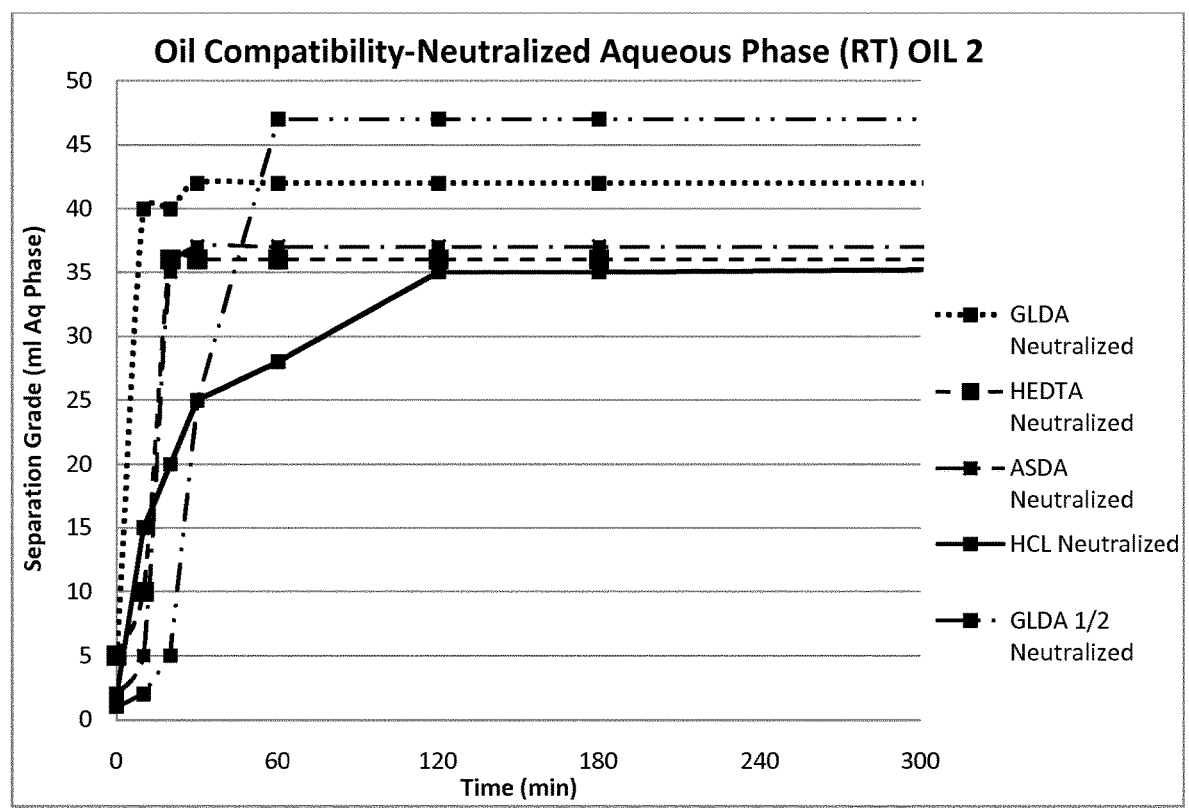

The results are summarized in Table 5 and shown in FIG. 5. The result indicate that the treatment fluids of the invention all separate faster and more completely from the oil layer than state of the art HCl, even if they have not fully reacted.

TABLE 5

Results obtained for the separation of oil 2 and the neutralized solutions

| Time (min) | HCl Neutralized X g $CaCO_3$ ml aqueous phase | GLDA Neutralized X g $CaCO_3$ ml aqueous phase | GLDA Neutralized ½ X g $CaCO_3$ ml aqueous phase | ASDA Neutralized X g $CaCO_3$ ml aqueous phase | HEDTA Neutralized X g $CaCO_3$ ml aqueous phase |
|---|---|---|---|---|---|
| 0 | 2 | 5 | 1 | 2 | 5 |
| 10 | 15 | 40 | 2 | 5 | 10 |
| 20 | 20 | 40 | 5 | 35 | 36 |
| 30 | 25 | 42 | 25 | 37 | 36 |
| 60 | 28 | 42 | 47 | 37 | 36 |
| 120 | 35 | 42 | 47 | 37 | 36 |
| 180 | 35 | 42 | 47 | 37 | 36 |
| 4,320 | 42 | 42 | 47 | 37 | 36 |

Example 6

Oil 3 and Non-Neutralized Solutions at Room Temperature 75 ml of oil 3 were added to a wide glass beaker and then 75 ml of the GLDA and HCl solutions were added on top. The glass beakers were then shaken vigorously by hand for 3 minutes. Immediately after stirring, the beaker was placed on a steady surface to visually check for phase separation, colour changes, formation of emulsions or precipitates.

While the solution containing GLDA separated completely in less than 10 minutes and showed no signs of emulsion formation, precipitates or colour change; the solution containing HCl did not separate after 24 hours, and the aqueous phase developed a dark yellow colour, in contrast to the initial transparent fluid.

The invention claimed is:

1. A two-step process to produce oil or gas from a subterranean formation, wherein in a first matrix acidizing and/or fracturing step the subterranean formation is treated with an aqueous composition having a pH in the range of 2-6 and containing a chelating agent selected from the group consisting of glutamic acid N,N-diacetic acid or a salt thereof (GLDA), aspartic acid N,N-diacetic acid or a salt thereof (ASDA), methylglycine N,N-diacetic acid or a salt thereof (MGDA), and N-hydroxyethyl ethylenediamine N,N',N'-triacetic acid or a salt thereof (HEDTA) to promote the production of oil or gas from the subterranean formation as an outlet stream from said subterranean formation, the outlet stream comprising (i) an aqueous phase comprising at least some of said aqueous composition containing said chelating agent, and (ii) a non-aqueous phase comprising said produced oil or gas, and wherein, in a next step the aqueous phase of said outlet stream is separated from the non-aqueous phase.

2. Process of claim 1, wherein the outlet stream from the subterranean formation comprises an emulsion, said emulsion containing the aqueous phase and the non-aqueous phase and wherein the separation step comprises one or more steps selected from the group consisting of (i) adding a chemical demulsifier, (ii) increasing the temperature of the emulsion, (iii) applying electrostatic fields that promote coalescence, and (iv) reducing the flow velocity, which flow velocity reduction allows gravitational separation of oil or gas and water.

3. Process of claim 1, wherein the aqueous composition contains 5 to 30 wt % of chelating agent on the basis of the total weight of the composition.

4. Process of claim 1, wherein the aqueous composition chelating agent comprises GLDA.

5. Process of claim 1, wherein the composition is a foamed or viscosified composition or is one part of a kit of parts containing in addition a preflush and/or postflush part.

6. Process of claim 1, wherein the process in addition contains a step of at least partially removing a filter cake that is present in the subterranean formation.

7. Process of claim 1, wherein the subterranean formation is a carbonate formation, a sandstone formation, a shale formation, a calcium carbonate-containing sandstone formation, a calcium carbonate-containing shale formation, an illitic carbonate formation or an illitic sandstone formation.

8. Process of claim 1, wherein the composition in addition contains a corrosion inhibitor in an amount of up to 2 volume % on total composition.

9. Process of claim 8, wherein the corrosion inhibitor is selected from the group consisting of amine compounds, quaternary ammonium compounds, and sulfur compounds.

10. Process of claim 1, wherein the composition in addition contains a surfactant in an amount of up to 2 volume % on total composition.

11. Process of claim 10, wherein the surfactant is selected from the group consisting of anionic, amphoteric, nonionic, and cationic surfactants.

12. Process of claim 1, wherein the composition in addition contains a further additive selected from the group consisting of mutual solvents, anti-sludge agents, surfactants, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, particulates, crosslinkers, relative permeability modifiers, sulfide scavengers, fibres, and nanoparticles.

13. Process of claim 1, wherein the composition has a pH of between 3 and 6.

14. Process of claim 1, wherein the process involves treating the subterranean formation to increase the permeability thereof, remove particles therefrom and/or remove inorganic scale therefrom.

15. Process of claim 1, wherein the process involves cleaning of a wellbore and/or descaling of an oil/gas production well and production equipment in the production of oil and/or gas from the subterranean formation.

* * * * *